G. M. EATON.
LOCOMOTIVE.
APPLICATION FILED JAN. 25, 1918.
Reissued June 10, 1919.
14,661.
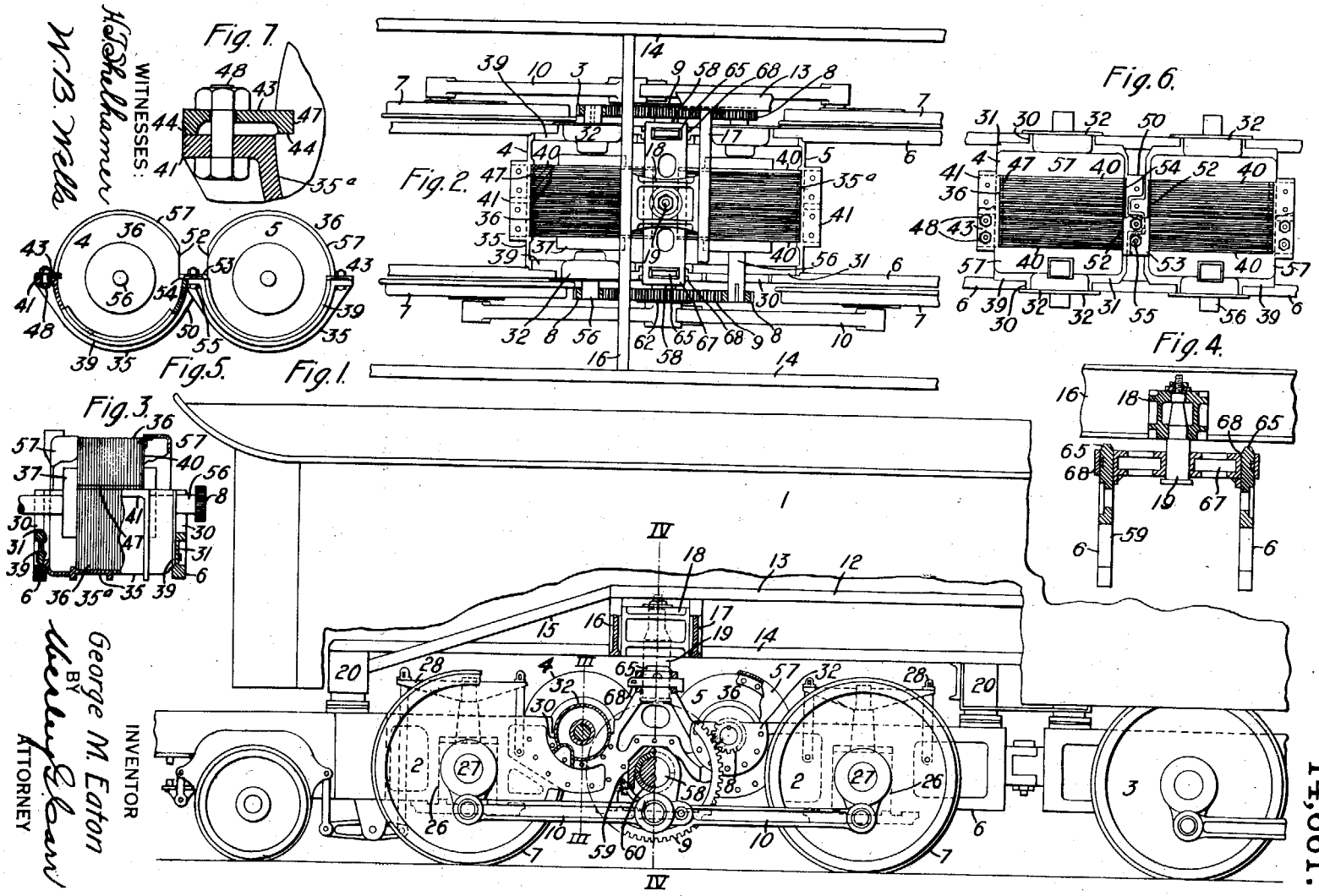
WITNESSES:
H. T. Shelhamer
W. B. Wells
INVENTOR
George M. Eaton
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE.

14,661. Specification of Reissued Letters Patent. Reissued June 10, 1919.

Original No. 1,241,500, dated October 2, 1917, Serial No. 837,745, filed May 11, 1914. Application for reissue filed January 25, 1919. Serial No. 273,187.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotives, of which the following is a specification.

My invention relates to electrically propelled vehicles, and it has special reference to electric railway locomotives.

The object of my invention is to provide an electric locomotive of the articulated type which shall be simple, strong and durable in construction, powerful and smooth-running in operation, and so constructed that it may be readily overhauled for repairs and reassembled with facility.

According to my invention, I provide a set of geared twin motors for each driving truck which are spring-supported between the driving axles and are mechanically connected to the driving wheels through a countershaft and side rods. By reason of the size and location of the driving motors, with respect to the side frames of the truck, it is impossible to provide a pivotal driving connection between the trucks and the locomotive body in the customary manner and, I, therefore, provide means associated with the side frames and disposed between the motors and materially above them for effecting the pivotal connection.

Moreover, I provide partially cylindrical motor-supporting frames which extend transversely between the side frames and are provided with end projections that are seated in suitable recesses in the inner sides of the respective side frames. When the motor supporting frames are rigidly secured to the side frames by bolts or other suitable means, the motor frames constitute permanent cross-ties of the truck frame and provide a particularly strong and rugged structure.

The driving motors differ in certain respects from the usual type of motor in that each motor embodies but a single substantially semi-cylindrical supporting frame into which a separable magnetizable core is seated and clamped in position, while the motor armature is supported in bearing housings, which are detachably secured to the locomotive side frames in concentric relation to the motor frame and magnetizable core. The magnetizable core member is entirely uncovered, and the end portions of the armature are protected by suitable casings, preferably of sheet material.

My invention may best be understood by reference to the accompanying drawing, in which Figure 1 is a view, in side elevation, of a portion of a locomotive constructed in accordance with my invention, certain parts being removed for the sake of clearness; Fig. 2 is a plan view of a portion of the locomotive shown in Fig. 1; Fig. 3 is a view, partially in section and partially in end elevation, of one of the driving motors, the section being taken along the line III—III of Fig. 1; Fig. 4 is a view, partially in section and partially in elevation, of the pivotal driving connection between the locomotive body and one of the driving trucks, the section being taken along the line IV—IV of Fig. 1; Figs. 5 and 6 are, respectively, a view in side elevation and a plan view of the set of driving motors shown in Fig. 1, and Fig. 7 is an enlarged detail view of the means for clamping the magnetizable core members of the motors in position.

Referring to the drawing, the structure shown comprises a locomotive body 1, and a plurality of articulated driving trucks 2 and 3 associated therewith, each of which is provided with a plurality of driving motors 4 and 5 which are carried by the side frames 6 and are mechanically connected to driving wheels 7 through the agency of pinions 8, gear wheels 9 and side rods 10.

The locomotive body 1, in general, may be of any suitable construction, and embodies a central raised floor portion 12 of trussed structure in order to acommodate the driving motors and a suitable center-pin structure. Any suitable construction may be employed for providing the raised floor portion of the cab body, but I find it preferable to employ elevated longitudinal beams 13 which are disposed within the main floor longitudinal beams 14 and are rigidly supported by means of inclined trusses 15 and cross-ties 16 and 17. The cross-tie 16 extends transversely between the main floor longitudinal beams 14, while the cross-ties 17 extend between the elevated beams 13. Between these ties 16 and 17, and in the central plane of the locomotive, is a centering block 18 which carries a suitable center pin 19 that is associated with the driving truck in such manner as to provide a pivotal driving connection between the truck and the locomotive body, as will be hereinafter set forth. As shown, the center pin 19 serves merely as a pivot and driving connection and takes no weight of the cab body, which weight is transmitted to the driving trucks through suitable spring-loaded friction plates 20, in a well-known manner, although I do not wish to be restricted in this respect.

Each driving truck embodies a plurality of side frames 6 which are provided, as is customary, with journal boxes 26 in which the driving axles 27 are disposed. The locomotive side frames 6, moreover, are supported on the journal boxes 26 by means of equalizer springs and linkage mechanisms 28. Each side frame 6 is provided, between the driving wheels 7, with a plurality of substantially semi-circular recesses 30 in the upper edge thereof, and with concentric substantially semi-circular recesses 31 in the inner side thereof. The recesses 30 and 31 of the respective frames are correspondingly disposed and the recesses 30 serve to support bearing housings 32, while the recesses 31 serve as seats to receive the ends of the motor frames, as will be hereinafter described.

Each of the driving motors comprises a supporting frame 35, a separable magnetizable core 36, an armature 37, a plurality of bearing housings 32, and a plurality of inclosing casings 57. The supporting member or frame 35 is substantially semi-cylindrical in form and is provided with end projections 39 which are also semi-cylindrical and are adapted to be seated within the recesses 31 in the respective side frames 6 and are bolted or otherwise secured thereto. The middle portion of the supporting frame 35 is counterbored to provide a semi-cylindrical seat 35ª in which the cylindrical magnetizable core 36 rests, said core preferably comprising a plurality of laminations which are disposed side-by-side and are intimately fastened together between end plates 40.

The supporting frame 35 is provided with an outwardly projecting side lug or bracket 41 which is flush with its upper surface and with which a clamping member 43 coöperates. The member 43 is of substantially the length of the core 36 and is provided with downwardly projecting lugs 44 at each of its sides. One side lug 44 of the member 43 rests upon the bracket 41, while the other side lug is disposed within a longitudinal slot 47 that is provided in the magnetizable core member 36 at a height corresponding substantially to the upper surface of the bracket 41. A plurality of clamping bolts 48 project through the bracket 41 and clamping member 43 intermediate its sides, and, thus serve to hold the core member 36 rigidly in position.

Inasmuch as the motors 4 and 5 are assembled in side-by-side relation, the adjacent sides of the respective supporting frames 35 are provided with a plurality of relatively narrow brackets 50 instead of a single bracket of the substantial length of the core member 36, and these brackets 50 are so disposed as to interlock with each other, as shown clearly in Fig. 6. The adjacent portions of the magnetizable cores 36 of the motors 4 and 5 are recessed and provided with substantially parallel faces 52 which are spaced sufficiently to permit the positioning of a clamping member 53 which is similar in construction to the member 43 already described. This intermediate clamping member 53 coöperates with ledges 54 on the respective cores 36, and serves to clamp down said cores, through the agency of bolts 55.

Care should be exercised to secure a concentric relation between the cylindrical bearing surfaces of the projecting members 39 of the supporting frames 35 and the intermediate cylindrical seats 35ª in which the cores are placed. If this relationship is secured, and also a concentric relation of the recesses 30 and 31 of the side frames, it is clear that the motors, when assembled in position, will have the desired concentricity of armature and field magnet core. The armatures 37 are provided with shafts 56 that are carried by the bearing housings 32 which are disposed in the side frame recesses 30 and are secured by bolts to said side frames 6.

It should be noted that no upper frame members are provided for the driving motors 4 and 5, as is customary, and that the magnetizable cores 36 are uncovered and exposed. The ends of the motors are covered by detachable casings 57 of sheet material which are suitably secured to the end plates 40 of the cores 36.

Both ends of the armature shafts 56 are provided with pinions 8 which mesh with the gears 9 that are carried by a countershaft 58. The countershaft 58 is located midway between the driving axles 27 and substantially on a level therewith, and is disposed within a pedestal opening 59 in which suitable bearing blocks 60 are positioned. The respective ends of the countershaft 58 are provided with cranks 62 which have connections with side rods 10 for the purpose of transmitting the driving effort of the motors to the driving wheels 7.

A plurality of upwardly projecting members 65 are preferably integrally associated with the respective side frames 6 directly above the countershaft 58, although the members 65 may be entirely separate from the side frames and detachably secured thereto. The members 65 project upwardly to a height substantially above the motors 4 and 5 and are rigidly connected by a cross-tie 67, the ends of which are provided with openings into which the upper ends of the members 65 project and are fitted. The cross-tie 67 is held in place rigidly by means of suitable removable keys 68 which coöperate with said cross-tie and with the upper ends of the projecting members 65. The cross-tie 67 is preferably permanently pivotally associated with the center pin 19.

When it is desired to overhaul one of the motors, the keys 68 are withdrawn, after which the locomotive body 1 may be raised, by means of a crane or other suitable apparatus, whereby the cross-tie 67 is detached from the projecting members 65 of the side frames 6. The driving truck may then be run out from under the locomotive body and the motors overhauled from above, after having first lowered the countershaft 58 and associated gears 9.

It is, of course, not essential that the cross-tie 67 be detachable from the members 65 and permanently associated with the center pin 19. If desired, the cross-tie 67 may be integral with the side frames 6 or permanently secured thereto, and separable from the center pin 19, in which case, greater difficulty is encountered in overhauling the motors, inasmuch as it would then be impossible to raise the motors directly from their seats, and would necessitate an angular overhauling thereof.

It will, of course, be understood that, in the center-pin structure which is employed for the other driving truck, provision must be made for a slight longitudinal movement, as is common practice with locomotives of the articulated type. In order to secure this relative movement, the openings in the ends of the cross tie 67 are made slightly longer than the longitudinal dimension of the upwardly projecting members 65, although other suitable means may be employed.

By reason of the arrangement and location of parts described, a particularly powerful locomotive is secured which is provided with relatively large driving motors that are rigidly carried by the side frames, the latter being spring-supported upon the driving axles. Furthermore, the motors are located within the rigid wheel base, and the number of driving gears is reduced to a minimum, while the elevated cross-tie and center-pin structure provides ample space for driving motors of a capacity which could not otherwise be employed.

Obviously, I do not wish to be restricted to the specific structural details and relationship of parts shown and described, as it is evident that the benefits of my invention may be secured by other structures differing to a greater or less extent, but embodying the principles of my invention. I therefore, desire that only such limitations shall be imposed as are indicated in the appended claims.

I claim as my invention:

1. In a vehicle, the combination with side frames having correspondingly disposed upwardly projecting members associated therewith, and a removable cross-tie joining the upper ends of said members, of a centering device associated with said cross-tie.

2. In a vehicle, the combination with side frames having correspondingly disposed upwardly projecting members associated therewith, and removable means for joining said upwardly projecting members, of centering means associated with said joining means.

3. In a vehicle, the combination with side frames having correspondingly disposed upwardly projecting members associated therewith, and a cross member removably secured to the upper ends of said upwardly projecting members, of a center-pin carried by said cross member.

4. In a vehicle, the combination with side frames having correspondingly disposed upwardly projecting members associated therewith, and a cross member coöperatively engaging the upper ends of said upwardly projecting members, of a center-pin associated with said cross member, and detachable means for securing said cross member to said projecting members.

5. In a vehicle, the combination with side frames having correspondingly disposed upwardly projecting members associated therewith and a cross-member having end openings to receive the upper ends of said upwardly projecting members, of locking means for securing said cross member to said upwardly projecting members and a centering device associated with said cross member.

6. In a vehicle having two pairs of driving wheels, the combination with a body, a running-gear having side frames, and a plurality of motors carried by said side frames and disposed between the pairs of driving wheels, of means associated with said side frames and disposed between and below the upper portions of said motors for pivotally connecting said running gear to said body.

7. In a vehicle having two pairs of driving wheels, the combination with a body, a running-gear having side frames, and a plurality of motors carried by said side frames and disposed between the pairs of driving wheels, of a cross member disposed between and below the upper portions of said motors and secured to said side frames, and a pivotal driving connection coöperating with said body and said cross member.

8. In a vehicle having two pairs of driving wheels, the combination with a body, a running-gear having side frames, and a plurality of motors carried by said side frames and disposed between the pairs of driving wheels, of upwardly projecting members associated with said side frames and disposed between said motors, a cross member secured to the upper ends of said projecting members and disposed below the upper portions of said motors, and means coöperating with said cross-member for associating said body with said running gear.

9. In a vehicle, the combination with a body having a raised floor portion of fractional width thereof, and a driving truck comprising side frames, a pair of motors carried thereby, two sets of driving wheels and means for mechanically connecting said motors to both sets of driving wheels, of an elevated cross member associated with said side frames and disposed below the upper portions of said motors, and means coöperating with said cross member and said raised floor portion of said body for providing a pivotal driving connection between said body and said truck.

10. In a vehicle, the combination with a plurality of side frames having oppositely disposed recesses therein, of a motor frame set into said recesses and rigidly secured to said side frames.

11. In a vehicle, the combination with a plurality of side frames having oppositely disposed recesses therein, of a combined cross-tie and motor frame fitted into said frame recesses and rigidly fastened to said side frames.

12. In a vehicle, the combination with a plurality of side frames having correspondingly disposed recesses in the inner sides thereof, of a motor frame having end portions adapted to fit into said recesses, and means for rigidly securing said motor frame to said side frames.

13. In a vehicle, the combination with a plurality of side frames having correspondingly disposed recesses in the inner sides thereof, of a motor frame having end portions adapted to fit into said recesses and bolts for rigidly securing said motor frame between said side frames to constitute a permanent cross-tie.

14. In a vehicle, the combination with a plurality of side frames having correspondingly disposed semi-circular recesses therein, of a motor frame disposed between said side frames and having semi-cylindrical ends fitted into said recesses, and means for securing said motor frame to said side frames.

15. In a vehicle, the combination with a plurality of sid frames having correspondingly disposed recesses therein, of a motor frame having its ends fitted into said recesses, said motor frame being located entirely below the upper surface of said side frames, and means for rigidly securing said motor frame to said side frames.

16. In a vehicle, the combination with a plurality of side frames, of a detachable cross-tie rigidly secured between said side frames, and a removable magnetizable motor core, cylindrical in form secured directly to said cross-tie.

17. In a vehicle, the combination with a plurality of side frames, of a cross-tie rigidly secured between said side frames, a stationary magnetizable field structure carried by said cross-tie, and a rotatable armature carried by said side frames.

18. In a vehicle, the combination with a plurality of side frames, of a substantially semi-cylindrical cross-tie rigidly secured between said side-frames, and a laminated magnetizable core supported by said cross-tie.

19. In a vehicle, the combination with a plurality of side frames, of a cross-tie rigidly secured between said side-frames, a laminated magnetizable core supported by said cross-tie, a rotatable armature coöperating with said core, and means associated with said side frames for supporting said armature.

20. In a vehicle, the combination with a plurality of side frames having correspondingly disposed recesses therein, of a stationary motor frame having ends fitted into one set of said recesses and secured to said side frames, a motor armature, and bearing members therefor fitted into the other set of recesses and secured to said side frames.

21. In a vehicle, the combination with a plurality of side frames having correspondingly disposed concentric recesses therein, of a stationary motor frame having semi-cylindrical end projections and a concentric intermediate upwardly concave portion, said end projections being adapted to be seated in one set of the recesses in said side frames, a cylindrical magnetizable core member disposed in said concave portion of said motor frame, bearing housings seated in the other set of side frame recesses, and an armature mounted in said housings.

22. In a vehicle, the combination with a plurality of side frames severally having a semi-circular recess in its upper edge and a larger concentric semi-circular recess in the inner side thereof, a motor frame having semi-cylindrical ends seated in said larger side frame recesses, and means for rigidly securing said motor frame to said side frames, of circular bearing housings adapted to rest in the recesses in the upper edges of said side frames, means for securing said housings to said side frames, and a rotatable motor armature mounted in said bearing housings.

23. In a vehicle, the combination with a plurality of side frames having correspondingly disposed semi-circular recesses in their upper edges and larger concentric semi-circular recesses in the inner edges of said frames, a motor frame having semi-cylindrical ends seated in said larger recesses, and means for rigidly securing said motor to said side frames, of a separable magnetizable core seated in said motor frame in coaxial relation with said concentric side frame recesses, a motor armature within said core, and detachable bearing members seated in the recesses in the upper edges of said side frames for supporting said armature in coaxial relation with said core.

24. In a vehicle, the combination with a plurality of side frames and a half-frame member rigidly secured thereto, of a separable magnetizable core seated in said member, and means coöperating with said core and said member for rigidly clamping said core in position.

25. In a vehicle, the combination with a plurality of side frames and a member rigidly secured thereto, of a separable magnetizable core seated in said member, and means coöperating with said core and the upper surface of said member for clamping said core rigidly in position.

26. In a vehicle, the combination with a body having a center-pin associated therewith, of a truck embodying side frames, a detachable cross member secured to said frames, and means for locking said cross member against vertical movement relative to said frames, said cross member being permanently associated with said center-pin.

27. In a vehicle, the combination with a body, a bar, and a center-pin permanently pivotally associated with said bar and said body, of a truck embodying side frames, means for locking said bar against vertical movement relative to said frames, and means for detachably securing said bar to said side frames.

28. In a vehicle, the combination with a body, a plurality of articulated driving trucks each embodying side frames, a plurality of pairs of driving wheels, and a plurality of mechanically connected motors mounted thereon and disposed between the pairs of driving wheels, of means associated with the side frames of each truck and disposed below the upper portions of said motors for pivotally connecting said trucks to said body, one of said trucks having relative longitudinal movement with respect to said body.

29. The combination with a semi-cylindrical supporting frame having a seat therein, of an uncovered laminated magnetizable core of cylindrical form disposed in said seat.

30. A motor field magnet structure comprising a single frame member having a seat therein, an uncovered laminated magnetizable core of cylindrical form disposed in said seat, and means comprising a key-and-slot connection for holding the core in position.

31. The combination with a supporting frame having a seat therein, of a removable uncovered laminated core disposed in said seat, an armature coöperating with said core, and inclosing casings for covering the ends of said armature.

32. A dynamo-electric machine comprising a half-frame, an uncovered laminated magnetizable core seated in said frame, and means coöperating with the upper surface of said frame and said core for clamping said core rigidly in position.

33. A dynamo-electric machine comprising a frame having a semi-cylindrical seat, a core of magnetizable material positioned within said seat, and means comprising a member attached to said frame and engaging a slot in said core for securing the latter in place.

34. A dynamo-electric machine comprising a lower half-frame having a semi-cylindrical seat, an uncovered laminated core of magnetizable material positioned within said seat, and means for securing said core in place.

35. A dynamo-electric machine comprising a lower half-frame having a semi-cylindrical seat, a laminated core of magnetizable material positioned within said seat, said core having substantially diametrically opposite grooves, and clamps adapted to engage said grooves and be clamped to said frame for securing said core in place.

36. A dynamo-electric machine comprising a frame having a semi-cylindrical seat, a unitary laminated core of magnetizable material disposed in said seat and having longitudinal side grooves, and clamps adapted to engage said grooves and be clamped to said frame for holding the core in place.

37. The combination with a plurality of dynamo-electric machines having frames disposed in side-by-side relation, each of said frames having a plurality of lateral extensions, the extensions from one of said frames being adapted to be received between the extensions from the other frame, and a single member to which all of said extensions are bolted for preventing relative movement between said frames.

38. The combination with a plurality of side-by-side supporting frames having registering lateral extensions, each of said frames having a semi-cylindrical core seat, core members of magnetizable material positioned within said seats, each of said core members having a longitudinal groove and an oppositely located shoulder member, said cores being assembled with said corresponding shoulder members adjacent, a clamp for engaging each of said grooves and said frame, and a single member engaging both of said shoulders and clamped to said extensions for holding said cores in position.

39. The combination with a frame having a semi-cylindrical core seat, of a cylindrical core positioned within said seat and having the upper portion thereof exposed, an armature positioned within said core, semi-circular end plates secured to the upper portions of the ends of said core, and incasing members secured to said end plates and said frame for inclosing the ends of said armature.

40. The combination with a supporting half-frame member, and an uncovered laminated magnetizable core seated in said member, of means coöperating with said core substantially throughout its length and with the upper surface of said supporting member for clamping said core rigidly in position.

41. The combination with a supporting half-frame member, and a separable magnetizable core seated in said member and having side recesses slightly above the upper surface of said supporting member, of clamping members disposed in said recesses and resting upon the upper surface of said supporting member, and means for causing said clamping members to exert pressure upon said core.

42. The combination with a supporting frame having a partially cylindrical seat, and a separable cylindrical core member seated therein and having a shoulder at substantially the level of the frame, of a clamping member adapted to coöperate with said shoulder and said frame, and means for clamping said member to said frame.

43. The combination with a plurality of side-by-side supporting frames having partially cylindrical seats, and cylindrical magnetizable cores disposed in said seats and having correspondingly located shoulders, of a single member coöperating with said shoulders, and means coöperating with said frames and said member for clamping said cores in position.

44. The combination with a plurality of side-by-side half frame members having seats therein, said magnetizable cores disposed in said seats, of a single member cooperating in common with said cores for rigidly positioning said cores in said frame members.

45. The combination with a twin half-frame structure having a pair of seats therein, and magnetizable cores disposed in said seats, of means coöperating in common with said cores for rigidly positioning said cores.

46. The combination with a half-frame member having a seat therein and a removable magnetizable core disposed therein and secured thereto, of a casing coöperating with said core and said frame member for inclosing one end of said frame.

In testimony whereof, I have hereunto subscribed my name this 24th day of Jan., 1919.

GEORGE M. EATON.